S. R. BRANN.
Damper.
No. 35,500.
Patented June 10, 1862.
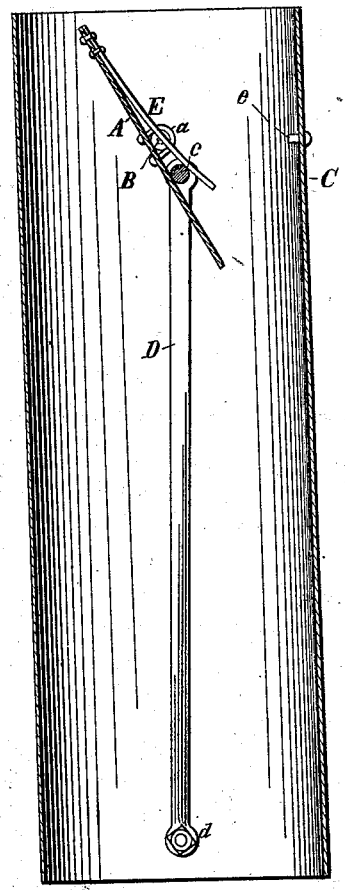
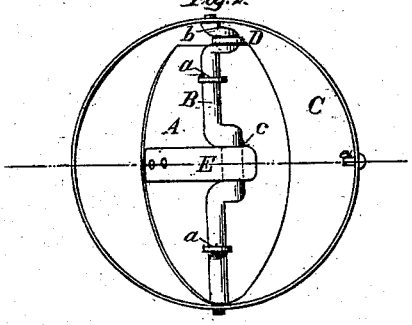

UNITED STATES PATENT OFFICE.

S. R. BRANN, OF HILLSBOROUGH, ILLINOIS.

IMPROVEMENT IN DAMPERS.

Specification forming part of Letters Patent No. 35,500, dated June 10, 1862.

*To all whom it may concern:*

Be it known that I, S. R. BRANN, of Hillsborough, in the county of Montgomery and State of Illinois, have invented a new and Improved Self-Regulating Damper; and I do hereby declare that the following is a full, clear, and exact description of the same, reference being had to the accompanying drawings, forming a part of this specification, in which—

Figure 1 represents a longitudinal vertical section of my invention. Fig. 2 is a horizontal section of the same.

Similar letters of reference in both views indicate corresponding parts.

This invention relates to an improvement in that class of dampers which are made self-regulating by the expansion of a metal rod exposed to the heat of the fire.

The invention consists in connecting the expansion-rod with the damper by means of a double-crank shaft and spring in such a manner that an expansion of said rod beyond a certain degree exerts no injurious influence on the connections or on the damper, and that when the damper is once closed and the rod continues to expand the entire strain exerted by the rod is thrown on the spring.

To enable those skilled in the art to make and use my invention, I will proceed to describe its construction and operation with reference to the drawings.

The damper A is made of a disk of sheet-iron or other suitable material, and it is secured to a rock-shaft, B, which has its bearings in the sides of the stove-pipe or flue C. When the damper is turned up, so as to be in line with the axis of the pipe or flue, it is open and the draft of the fire is unobstructed; but if the damper is turned down to a position at right angles with the axis of the pipe or flue, or nearly so, the draft of the fire is closed.

The damper A is attached to the rock-shaft B by means of staples a, which permit it to swing freely on the same, and the rock-shaft is provided with two cranks, b c, one near its end and the other in about the center of its length, as clearly shown in Fig. 2 of the drawings.

D is the rod, the expansion of which regulates the position of the damper. The lower end of this rod is rigidly attached to the pipe or flue C by means of a screw and nut, d, or in any other desirable manner, and its upper end is attached to the crank b. The crank c acts on a spring, E, which is riveted or otherwise fastened to the edge of the damper, and which extends over the crank c, as clearly shown in the drawings.

If the rod D, which is exposed to the action of the fire, expands by the heat, the rock-shaft B is turned in the direction of the arrow marked upon it in Fig. 1, and the crank c acts upon the spring E and causes the damper to turn in the direction of the arrow marked near it in Fig. 1. When the damper is fully closed, it strikes the pin e, which projects from the inside of the pipe or flue, and by this pin the damper is prevented to turn any farther than necessary to close it, or turn so far that it will open in the opposite direction; but if the rod still continues to expand the rock-shaft B will continue to turn in the direction of the arrow marked on it in Fig. 1, and the damper would be forced hard against the pin e, and the device would be liable to be injured if the connection between the rock-shaft and damper was not made yielding by means of the spring E. If the rod continues to expand after the damper has already been closed, the crank c, which acts entirely on said spring, causes the same to bend and the rock-shaft rotates independent of the damper. The entire strain exerted by the expansion of the rod D after the damper has already closed is intercepted by the spring, and the different parts of my device are not liable to sustain any injury.

Having thus fully described my invention, what I claim as new, and desire to secure by Letters Patent, is—

The arrangement of the spring E, in combination with double-crank shaft B, damper A, rod D, and stove-pipe or flue C, all constructed and operating substantially in the manner and for the purpose shown and described.

S. R. BRANN.

Witnesses:
W. R. TRUESDELL,
J. L. HENNEN.